United States Patent [19]

Okumura

[11] Patent Number: 4,560,526

[45] Date of Patent: Dec. 24, 1985

[54] PROCESS FOR PREPARING MOLDED SILICON CARBIDE PRODUCT

[75] Inventor: Masatoshi Okumura, Kitamoto, Japan

[73] Assignee: Shin Nisso Kako Co., Ltd., Japan

[21] Appl. No.: 588,758

[22] Filed: Mar. 12, 1984

[30] Foreign Application Priority Data

Mar. 18, 1983 [JP] Japan ................... 58-44502

[51] Int. Cl.$^4$ ............................................. C04B 35/56
[52] U.S. Cl. .................... 264/328.2; 264/63; 501/88
[58] Field of Search ................. 419/87; 264/63, 328.2; 501/88

[56] References Cited

U.S. PATENT DOCUMENTS

| | | | |
|---|---|---|---|
| 4,052,430 | 10/1977 | Yajima et al. | 260/448 D |
| 4,117,057 | 9/1978 | Yajima et al. | 264/63 |
| 4,122,139 | 10/1978 | Yajima et al. | 264/63 |
| 4,159,259 | 6/1979 | Yajima et al. | 528/14 |
| 4,220,600 | 9/1980 | Yajima et al. | 556/434 |

FOREIGN PATENT DOCUMENTS

| | | |
|---|---|---|
| 126300 | 12/1976 | Japan . |
| 40509 | 5/1977 | Japan . |
| 112700 | 10/1977 | Japan . |
| 61299 | 6/1979 | Japan . |
| 16029 | 2/1982 | Japan . |
| 2106528 | 4/1983 | United Kingdom . |

*Primary Examiner*—Allan M. Lieberman
*Attorney, Agent, or Firm*—Abelman Frayne Rezac & Schwab

[57] ABSTRACT

A process for preparing a molded silicon carbide product, by molding a mixture of silicon carbide powder, an organosilicon compound and one or more lubricants to form a compact and sintering the thus-formed compact, is described.

28 Claims, No Drawings

PROCESS FOR PREPARING MOLDED SILICON CARBIDE PRODUCT

This invention relates to a process of preparing a molded silicon carbide product by using silicon carbide powder as a raw material. More specifically it relates to an improvement of the process disclosed in Japanese Patent Laid-open No. 40509/1977 providing a process to prepare a molded silicon carbide product from silicon carbide powder using an organosilicon compound as a binder. Namely, this invention provides a process of preparing a molded silicon carbide product, which comprises molding a mixture of silicon carbide powder, an organosilicon compound and one or more lubricants selected from higher fatty acids, higher fatty acid esters, higher fatty acid amides, higher alocohols and paraffin wax, to form a compact, and sintering the thus-formed compact.

To obtain a molded ceramic product by molding and sintering ceramics powder as raw material, it is generally practiced to mix the powder with a molding additive (for example, a lubricant such as a low molecular weight polyolefin, paraffin wax, metal soap, saturated or unsaturated higher fatty acid, its ester or amide, or a higher alcohol as well as a binder, dispersant, plasticizer and the like as needed) in order to improve the fluidity and releasability from a mold at the time of molding. In this case the prepared mixture is molded and sintered under elevated pressure so that pores produced as a result of the removal of such molding additives owing to heat applied in the course of the sintering (this is generally called "defatting"), may be compressed to enhance the degree of bonding among particles. However, in the case of silicon carbide power, the mutual bonding (i.e., self-bonding) among particles occurs very infrequently, even if it is solely heated to high temperature under high pressure to induce its sintering. It is therefore needless to say that it is very difficult to obtain a sintered silicon carbide product having actual utility, when molding additives, such as those cited above, which reduce the self-bonding still further, are incorporated to silicon carbide powder for molding.

It has also been proposed to use as a binder, for example, alumina, boron, metallic silicon, silicon nitride or tungsten carbide to enhance the ability of sintering of silicon carbide powder. Molded and sintered products obtained in accordance with the above process, however, inevitably contain remainders of used binders. Accordingly, it is not practical to use these sintered products, which have been obtained by means of such a process, as crucibles or nozzles for producing, for example, single silicon crystals of high purity or highly pure metals.

As a method for solving such a problem, Japanese Patent Laid-open No. 40509/1977 proposes to employ an organosilicon compound as a binder for silicon carbide powder. According to this method, the organosilicon compound mixed as a binder with silicon carbide powder undergoes pyrolysis in the course of the sintering of a resultant molded mixture, thereby causing all volatile substances which are produced by pyrolysis to evaporate. The remaining silicon and carbon form strong bonds, with the silicon carbide used as a raw material, owing to high temperatures reached during the sintering operation, to form a sintered product.

In other words, the silicon and carbon of the organosilicon compound are gradually combined with silicon carbide powder owing to the high temperatures reached during the sintering and are eventually converted to silicon carbide. Therefore, they help the sintering of silicon carbide powder which per se has a feature of slow self-diffusion, and form strong bonds.

However, a mixture of silicon carbide powder and an organosilicon compound has poor fluidity. Such a mixture does not easily flow into a mold upon its molding. It is also difficult to avoid sticking of the mixture to a mold completely even if a releasing agent (for example, a metal salt) is coated on the mold to avoid adherence of the mixture to the mold. Therefore, molded matter (compacts) are in many instances liable to damages. It is thus difficult to subject such a mixture to injection molding, and such a mixture is improper for mass production of molded products. Use of high pressures (for example, 2500–3000 kg/cm$^2$) is indispensable during the molding operation preceding the sintering operation if one wants to obtain a sintered silicon carbide product having high strength from such a mixture. Such high pressures, however, promote sticking to molds still further.

The present inventors have carried out an intensive research to develop a process of preparing a molded silicon carbide product readily from silicon carbide powder by overcoming the above-mentioned problems. As a result, the present invention has now been completed. It has been found that a mixture made by incorporation of a lubricant selected from the group consisting of higher fatty acids, higher fatty acid esters, higher fatty acid amides, higher alcohols and paraffin wax to a mixture of silicon carbide powder and an organosilicon compound, disclosed in Japanese Patent Laid-open No. 40509/1977, has good fluidity and releasability, and that the mixture reaches with ease every end of a used mold, even when the mold has complex configurations, and that each molded material (i.e., compact) releases from the mold easily owing to the removal of the sticking problem to the mold, and that the resultant mixture may be subjected not only to compression molding but also to injection molding which has been unable with a silicon carbide powder. Furthermore, it has been unexpectedly found that even if such a lubricant is incorporated, a sintered product obtained by the sintering of such a compact has mechanical strength, which is the same or superior to that of a sintered product obtained without addition of a lubricant.

Fundamentally speaking, the mechanical strength of a sintered silicon carbide product is substantially proportional to its density as long as sintering conditions are the same. When a mixture of silicon carbide powder and an organosilicon compound is molded and then sintered, the organosilicon compound is thermally decomposed and resulting volatile substances evaporate. As a result, the resultant sintered product becomes somewhat porous.

In the case of general ceramics powder or a powdery mixture obtained by adding a binder such as, for example, alumina to silicon carbide powder, strong bonds may be formed by conducting the sintering while compressing the pores, which have been formed subsequent to the defatting of forming additives as mentioned above, by applying external pressures, or by filling out such pores, owing to the diffusion shrinkage of the resulting ceramics per se during their sintering operations.

When silicon carbide powder is molded and sintered using an organosilicon compound as a binder, the compression of the pores, which are formed as a result of evaporation of volatile substances produced by pyrolysis, by applying external pressures in the course of its sintering operation, leads to an increased density of the resulting molded product, too. Nevertheless such external pressures suppress the formation of bonds between carbon or silicon or their compounds, which are formed by the pyrolysis of the organosilicon compound, and silicon carbide powder used as a raw material, or they break such bonds. Thus, such external pressures serve as a cause for reduction in mechanical strength of the resulting sintered product (i.e., molded silicon carbide product). Accordingly, such external pressures must be avoided in this case. Furthermore, the organosilicon compound does not undergo fusion-shrinkage upon sintering of a mixture in which the compound is incorporated. Hence, the reduction of density of a sintered product caused by an addition of an organosilicon compound, remains unchanged. Therefore, it is preferred to limit the amount of such an organosilicon compound to the minimum necessary level in the above process to avoid the reduction of density of a resulting sintered product. Therefore, it has been absolutely inconsistent with common knowledge to make a further addition of a material which is expected to induce a reduction of density and correspondingly a reduction of mechanical strength of resulting sintered product due to the defatting of such a material in the course of its sintering.

Contrary to such expectation, the present inventors have found that the addition of a lubricant, which is useful in the practice of this invention, to a mixture of silicon carbide powder and an organosilicon compound does not reduce the density and, as a result, the mechanical strength of the resulting molded silicon carbide product conversely facilitates the fabrication of a formed product having a higher density and, hence, greater mechanical strength. A comparison between a molded silicon carbide product prepared with an addition of such a lubricant and that produced without any addition of such lubricant indicates that the mechanical strength of the former product is superior to that of the latter product when both products have the same density. In some instances the mechanical strength of the former product may still be greater than that of the latter product even if the density of the former product is lower than that of the latter product.

Besides the above-mentioned good fluidity and releasability of a mixture of silicon carbide powder, an organosilicon compound and a lubricant, the mixture has excellent toughness. Therefore, damages of compact made of the mixture seldom occur in the course of its molding operation.

Organosilicon compounds are generally liable to be oxidized at high temperatures. If one tries to mold, at low pressure, a mixture of silicon carbide powder and an organosilicon compound having high molecular weight (i.e., having high melting point) which is excellent owing to its small weight reduction upon its sintering, a problem occurs wherein the organosilicon compound is oxidized at the elevated temperatures required to impart fluidity to the organosilicon compound and is thus deteriorated in quality. Thus, a very high pressure is required if one wants to conduct the molding operation at a low temperature in order to avoid such oxidation. The fluidity of a high m.p. organosilicon compound may be increased by an addition of a lubricant cited above which is miscible with such an organosilicon compound, and the organosilicon compound becomes soft at low temperatures at which there is no danger of oxidation and quality modifications. As a result, a compact of a mixture made of silicon carbide powder, an organosilicon compound and a lubricant can provide a sintered product which is homogeneous and has a great mechanical strength upon completion of its sintering even if the molding temperature and the forming pressure are relatively low (the pressure is, for example, 200–700 kg/cm$^2$).

The lubricants may be used solely or in combination in this invention. They have good miscibility with organosilicon compounds and resulting mixtures may be either liquid or solid. For easier handling, it is desirous that the mixture melts at a temperature of about 40° C. or higher. Besides, it is necessary to the lubricant that the resulting melt of the mixture of the lubricant and organosilicon compound has a low viscosity, exhibits good external and internal lubricating effects when combined with silicon carbide powder, and undergoes almost complete evaporation at a temperature, at which organosilicon compound is converted to semi-inorganic substances owing to its pyrolysis (namely, about 200°–500° C.) or at a lower temperature, although it must not evaporate substantially at temperatures which it encounters during such operations as mixing, drying, molding, etc. It is also required that the mixture does not, practically, leave any element other than carbon and silicon in the resulting sintered products.

The following materials may be mentioned as examples of lubricant useful in the practice of this invention; capric acid, palmitic acid, stearic acid, oleic acid and the like as higher fatty acids; butyl stearate, animal and vegetable fats or waxes (carnauba wax, bees wax) and the like as higher fatty acid esters; oleic amide, linolenic amide, linolic acid, etc. as higher fatty acid amides; caprylic alcohol, lauryl alcohol, stearyl alcohol and the like as higher alcohols; and paraffin wax #1–#9 prescribed in JIS K-2235-59 as paraffin waxes, but not limited to them.

The organosilicon compound useful in the practice of this invention may be one or more compounds selected from compounds in which:

(1) silicon atoms are bonded only with carbon atoms;
(2) besides the bonds between silicon atoms and carbon atoms, silicon atoms are bonded with hydrogen atoms;
(3) besides the bonds between silicon atoms and carbon atoms, there are bonds formed between silicon atoms and halogen atoms;
(4) in addition to the bonds between silicon atoms and carbon atoms, there are bonds established between silicon atoms per se: and
(5) there are two or more types of bonds out of the above-mentioned bonds (2) through (4), or a polycondensation product, obtained by polycondensation of these compounds, containing silicon-carbon bonds as its principal backbone structure.

The following compounds may be mentioned as representative examples of organosilicon compounds. In the following structural formulas R represents a lower alkyl group or a phenyl group.

As example of the compounds classified under the above group (1), in which silicon atoms are bonded with carbon atoms only, the following specific compounds may be mentioned.

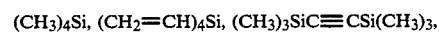

$(CH_3)_4Si$, $(CH_2=CH)_4Si$, $(CH_3)_3SiC\equiv CSi(CH_3)_3$,

-continued (CH$_2$)$_5$Si(CH$_2$)$_4$, (C$_2$H$_5$)$_3$SiCH$_2$CH$_2$Cl, (C$_6$H$_5$)$_3$SiCOOH,

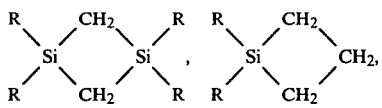

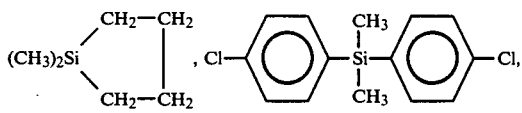

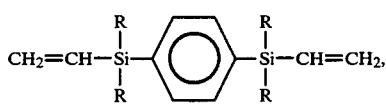

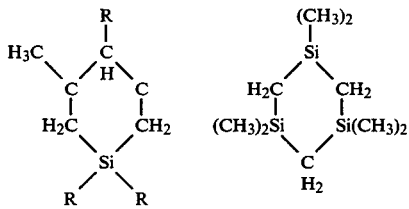

As compounds which contain bonds between silicon atoms and hydrogen atoms in addition to the bonds between silicon atoms and carbon atoms, mono-, di- and triorganosilanes may be mentioned. The following compounds fall for example in this category.

(C$_2$H$_5$)$_2$SiH$_2$, (CH$_2$)$_3$SiH$_2$, (CH$_3$)$_3$SiCH$_2$Si(CH$_3$)$_2$H, ClCH$_2$SiH$_3$,

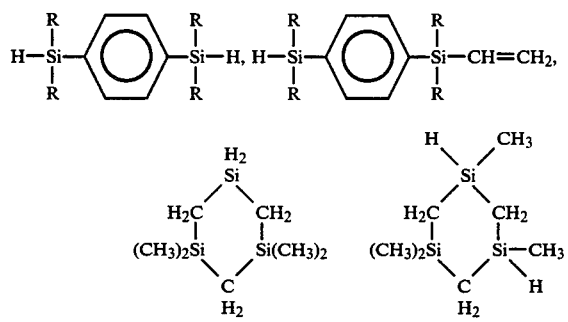

Compounds containing the bonds between halogen atoms and silicon atoms in addition to the bonds between silicon atoms and carbon atoms are called organohalosilanes, which may for example include the following compounds:

CH$_2$=CHSiF$_3$, C$_2$H$_5$SiHCl$_2$, (CH$_3$)$_2$(ClCH$_2$)SiSi(CH$_3$)$_2$Cl,

-continued

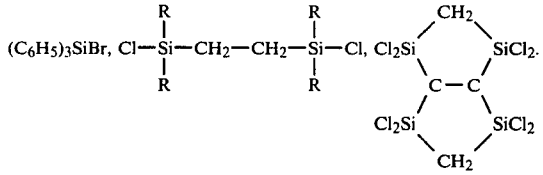

The following exemplary compounds may be mentioned as compounds containing the bonds between silicon atoms per se:

(CH$_3$)$_3$SiSi(CH$_3$)$_2$Cl, (CH$_3$)$_2$SiSi(CH$_3$)$_3$,

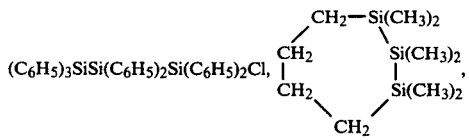

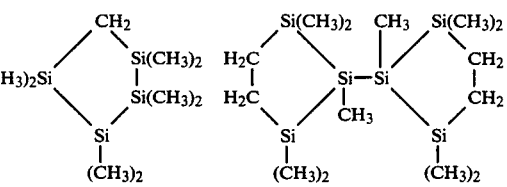

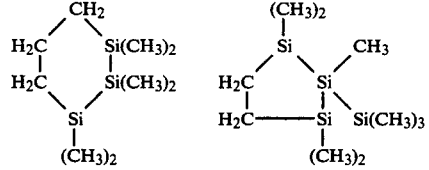

As polycondensated organosilicon compounds obtained by condensation of these organosilicon compounds and containing silicon-carbon bonds as their principal backbone structures, it is suitable to use in this invention the high molecular organosilicon compounds formed principally of carbosilane skeltones, which are disclosed in Japanese Patent Laid-open Nos. 126300/1976, 112700/1977, 61299/1979 and 16029/1982. These high molecular organosilicon compounds may be obtained for example by subjecting polydimethylsilanes, which may in turn be prepared, for example, by causing dimethyl dichlorosilane (CH$_3$)$_2$SiCl$_2$ to undergo dechlorination-condensation reactions in xylene by metallic sodium, to pyrolytic condensation reactions and are generally called polycarbosilanes.

The molecular structures of such polycarbosilanes are basically formed of the following two types of partial structures, which are combined together in various ways:

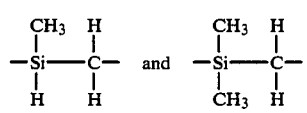

and in some cases, they seem to contain the following partial structures at small proportions:

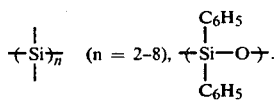

It is convenient to use organosilicon compounds having boiling points of 250° C. or higher in the present invention.

In the present invention, the suitable proportion of one or more lubricants to be used may range from 1/5 to 2.0 times, more preferably, from ½ to 1.5 times based on the weight of organosilicon compound. Any amounts less than the above lower limit would be unable to bring about their effects satisfactorily. If they are used beyond the above upper limit on the other hand, there would be developed such drawbacks that molded ceramic compacts would be deformed in the course of their sintering operations or the resulting sintered products would become excessively porous and would hence be reduced in mechanical strength. It should, however, be borne in mind that the proportion of lubricant to organosilicon compound is not necessarily be limited to the above range, because it may vary in accordance with, for example, the molecular weight of an organosilicon compound to be used, the average particle size, distribution of particle size of silicon carbide powder to be employed, or sintering conditions, etc.

In order to prepare a mixture consisting of silicon carbide powder, an organosilicon compound and a lubricant, the organosilicon compound and lubricant may first of all be molten under heating into a mixture, followed by an addition of the silicon carbide powder thereinto and a subsequent mixing of the resultant mixture. Alternatively, the former mixture may be dissolved in an inert solvent capable of dissolving both organosilicon compound and lubricants, for example, benzene, toluene, xylene, hexane, chloroform or the like. Then, silicon carbide powder is added to the thus-prepared solution, followed by a thorough-mixing of the resultant mixture. The solvent is thereafter caused to evaporate to a suitable extent. As a further alternative procedure, the organosilicon compound and lubricants may be directly dissolved in the aforementioned solvent, followed by an addition of silicon carbide powder to the resultant solution. Or, the three components may be added in an arbitrary order to the solvent. After stirring and mixing the resultant mixture thoroughly, the solvent may be driven off to a suitable extent.

The optimum proportion of the total amount of the mixture of the organosilicon compound and lubricant to silicon carbide powder may vary in accordance with the average particle size and particle size distribution of the silicon carbide powder and sintering conditions (particularly, the temperature-raising velocity) and cannot thus be defined conclusively. Where the average particle size of silicon carbide powder is small, in other words, where the specific surface area of silicon carbide powder is large, the above-mentioned proportion of the mixture is required to be high. Namely, the optimum proportion decreases as the average particle size becomes greater. For instance, when silicon carbide powder has an average particle size of 6 μm and a specific surface area of 2 m²/g, the optimum proportion may be 5–20 g per 100 g of the former silicon carbide powder, and when silicon carbide powder has an average particle size of 0.27 μm and a specific surface area of 17.7 m²/g, the the optimum proportion may be 10–30 g per 100 g of the silicon carbide powder.

It may be feasible to raise the above-mentioned proportion further where a suitable level of pressure may be applied during the removal of the lubricants upon sintering.

The thus-prepared mixture, which is made of silicon carbide powder, an organosilicon compound and a lubricant is then moled into a desired shape by compression molding, extrusion molding or injection molding under a pressure of 200–700 kg/cm² or so to form a compact. The thus-formed compact is then sintered at temperatures of 800°–2000° C., or preferably 1100°–1300° C. in an inert gas stream or in vacuo, thereby obtaining a molded silicon carbide product.

In the present invention, the type of silicon carbide powder may be chosen as desired in accordance with the end use of the resulting product. When β-type silicon carbide powder is used, however, since silicon carbide formed from the organosilicon compound upon sintering is β-type crystals, a molded silicon carbide product to be obtained upon sintering a formed compact at 1100°–1300° C. will have uniform composition of β-type silicon carbide.

It is possible to use silicon carbide whiskers (fibrils) in combination with silicon carbide powder in this invention. Interlocking between silicon carbide powder and silicon carbide whiskers can be achieved smoothly in the present invention, thereby providing sintered products having excellent mechanical strength, especially in impact resistance.

Incidentally, each molded silicon carbide product prepared in accordance with the present invention may be rendered stronger when it is impregnated with a liquid or solution-type organosilicon compound or a liquid mixture of the organosilicon compound and a lubricant and the thus-impregnated product is sintered again. It may be feasible to incorporate, for example, an organometallic compound or the like in a powdery ceramics mixture for imparting some special properties, for instance, to the electrical properties, mechanical properties or the like of a resulting molded silicon carbide product.

Certain examples and comparative examples will be given below. Comparison between Example 1 and Comparative Example 1 indicates that the addition of a lubricant (stearic acid) permits the lowering of the pressure required to form a compact significantly and improves the bending strength of the resultant sintered product. Examples 2 and 3 indicate that silicon carbide powder may be molded into desired shapes by injection molding when the process of this invention is applied. Furthermore, Examples 1 and 5 show that the molding pressure may be lowered and furthermore significantly good effects may be given to the strength of final molded silicon carbide product when the molding temperature is raised to a suitable level.

Comparison between Examples 5 and 6 and Comparative Example 6 as well as a comparison between Example 7 and Example 8 indicate that, when silicon carbide powder and an organosilicon compound are used in the same amounts, the molding pressure required to obtain a molded silicon carbide product having the same specific gravity after its sintering can be lowered and the mechanical strength of the resulting molded silicon carbide product increases within the range of such experiments when the proportion of stearic acid is increased. On the other hand, comparison between Example 5 and Example 7 as well as that between Example 9 and Comparative Example 2 teaches that the mechanical strength of a molded silicon carbide product can be enhanced by replacing a part of the expensive organosilicon compound with the economical stearic acid.

EXAMPLE 1

200 g of the organosilicon compound, i.e., polycarbosilane (m.p. 70°–80° C.), which was synthesized at about 350° C. by adding a borophenyl siloxane compound to polydimethylsilane obtained by dechlorination-condensation of dimethyl dichlorosilane with metallic sodium in xylene, and 100 g of stearic acid (JIS Extra Pure grade) were dissolved in 1 liter of toluene followed by addition of 2 kg of α-type silicon carbide powder (product of Showa Denko Kabushiki Kaisha; "DENSIC ULTRAFINE A-4"; specific surface area: 2 $m^2/g$; average particle size: 6 μm; cumulative weight percents (on sieve): 5%–30 μm, 30%–10 μm, 55%–5 μm and 95%–1 μm). Toluene was evaporated while kneading the mixture in a mortar, thereby obtaining a fine powdery mixture. Kneading was always carried out smoothly until the toluene was evaporated completely.

The thus-prepared powder was filled in a mold of 25 mm×25 mm and pressed at 25° C. and 700 kg/cm$^2$ into a planar compact of 3 mm thick. The specific gravity and porosity of the compact were 2.21 and 10.5% respectively.

The compact was heated to 1250° C. under a nitrogen stream in an electric furnace with a temperature-raising velocity of 50° C./hour so as to complete its sintering. Thus, a silicon carbide plate having smooth surfaces was obtained. The dimensions of the plate were not substantially different compared with the dimensions which the compact had before its sintering. It had a specific gravity of 2.19 and its bending strength, which was determined in accordance with JIS R 1601, was 17.9 kg.f/mm$^2$.

COMPARATIVE EXAMPLE 1

200 g of the polycarbosilane, which had been synthesized in Example 1, were dissolved in 1 liter of toluene without using stearic acid. Thereafter, 2 kg of "DENSIC ULTRAFINE A-4" was added and toluene was evaporated while kneading the mixture in a mortar. Here, the kneading became more difficult as the proportion of toluene decreased due to its evaporation. Thus, the kneading operation was eventually stopped and the mixture was thereafter allowed to stand so as to permit further evaporation of toluene. The contents of the mortar had solidified and the homogenuity of the mixture of silicon carbide powder and the polycarbosilane was inferior to the powder obtained in Example 1.

The thus-solidified mixture was then comminuted into powder. The powder was molded using the same mold as that used in Example 1. In order to form a compact having the same specific gravity as that achieved in Example 1, it was necessary to apply a pressure of 2800 kg.f/cm$^2$ at 25° C.

The thus-obtained compact was sintered in the same manner as in Example 1, thereby obtaining a silicon carbide plate. The specific gravity and bending strength of the plate were 2.1 and 5.0 kg.f/mm$^2$ respectively.

It was also attempted to mold the powder, which had been obtained by comminuting the above mixture, by means of an injection molding machine. However, the powder did not flow freely and stuck on the mold, thereby making its injection molding impossible.

EXAMPLE 2

2.0 kg of the polycarbosilane synthesized in Example 1, 2.5 kg of stearic acid and 20 kg of β-type silicon carbide powder (product of Showa Denko Kabushiki Kaisha; "DENSIC ULTRAFINE β-1; specific surface area: 15 m$^2$/g; average particle size: 0.45 μm; cumulative weight percents: 0%–5 μm, 0%–2 μm, 5%–1 μm and 60%–0.4 μm) were added to 10 liters of toluene. Toluene was evaporated while kneading the mixture, thereby obtaining a fine powdery mixture. The powder was charged in an injection molding machine and was injected at 70° C. and 800 kg/cm$^2$ into a mold. Planar compacts having the same dimensions as those of the compact obtained in Example 1 were continuously formed. The specific gravity and porosity of each of the compacts were 2.40 and 0% respectively.

The planar compacts were sintered in the same manner as in Example 1, thereby obtaining silicon carbide plates. Each of the plates had a specific gravity of 2.40 and a bending strength of 22.0 kg.f/mm$^2$.

EXAMPLE 3

An experiment was conducted in the same manner as in Example 2 except that capric acid was used in place of stearic acid. The experiment gave a silicon carbide plate having almost the same properties as those of the plate produced in Example 2.

EXAMPLE 4

A silicon carbide plate having almost the same properties as the silicon carbide plate obtained in Example 1 was produced, following the procedures of Example 1 except that industrial strearic acid (which consisted principally of stearic acid and palmitic acid and had a melting point of about 50° C.) was employed in lieu of stearic acid of JIS Extra Pure grade.

Similar results were also obtained when paraffin wax (JIS K-2235-59, #5) was used instead of the above-mentioned stearic acid.

EXAMPLE 5

A powdery mixture was prepared in the same manner as in Example 1 except that the polycarbosilane and stearic acid were individually reduced in amounts to halves. The powdery mixture was then molded by compression at 70° C. and 200 kg/cm$^2$ to produce a planar compact. The specific gravity and porosity of the planar compact were 2.76 and 0% respectively.

The planar compact was sintered in a manner similar to that employed in Example 1, thereby producing a silicon carbide plate. The silicon carbide plate had a specific gravity of 2.67 and a bending strength of 23.0 kg.f/mm$^2$.

EXAMPLES 6–10

Mixtures were prepared in the same manner as in Example 1, using 20 g of "BETA RANDOM ULTRAFINE" (product of IBIDEN CO., LTD.; average particle size: 0.27 μm; specific surface area: 17.7 m$^2$/g; cumulative weight percents (on sieve): 3.2%–1 μm, 17%–0.5 μm and 68%–0.2 μm) as silicon carbide powder and a polycarbosilane having a melting point of 60°–70° C. obtained by fractional distillation of a polycarbosilane synthesized by heating a polydimethylsilane, which had been synthesized in Example 1, at 400°–450° C. and for 14 hours. The proportions of the polycarbosilane and stearic acid were changed in various ways as described in Table 1. Each of the mixtures was molded by compression at 30° C. using a mold having the same dimensions as those of the mold used in Example 1, thereby forming a planar compact of 3 mm thick. The thus-prepared planar compacts were sintered in the same manner as in Example 1. With respect to those having a specific gravity of 2.08 out of the silicon carbide plates obtained by the above sintering operations, the amounts of used polycarbosilane and stearic acid, molding pressures, the specific gravities and porosities of their corresponding compacts and the bending strengths of the silicon carbide plates after their sintering operations are shown in Table 1.

Comparative Example 2

Planar compacts, each of which had a thickness of 3 mm, were prepared at 30° C., using "BETA RANDOM ULTRAFINE" and the same polycarbosilane as that used in Examples 6–10 in the same amounts as in Example 6, employing absolutely no stearic acid, and using the same mold as that used in Example 6. The thus-prepared planar compacts were sintered under the same conditions. With respect to those having a specific gravity of 2.08 out of the thus-obtained silicon carbide plates, their molding pressures, the specific gravities and porosities of the corresponding compacts and the bending strengths of the silicon carbide plates after their sintering operations are summarized in Table 1.

TABLE 1

| Example No. | 6 | 7 | 8 | 9 | 10 | Comp. Ex. 2 |
|---|---|---|---|---|---|---|
| Polycarbosilane (g) | 2 | 2 | 3 | 3 | 1.4 | 2 |
| Stearic acid (g) | 2 | 1 | 1 | 1.5 | 0.6 | 0 |
| Molding pressure (kg/cm$^2$) | 500 | 600 | 700 | 600 | 600 | 6000 |
| Specific gravity of compact | 2.28 | 2.17 | 2.14 | 2.16 | 2.16 | 2.08 |
| Porosity of compact (%) | 1.4 | 12.7 | 8.0 | 5.2 | 19.0 | 24.0 |
| Bending strength of sintered plate (kg·f/mm$^2$) | 11.5 | 11.0 | 10.5 | 11.5 | 10.0 | 4.0 |

EXAMPLES 11–14

Polycarbosilanes having various melting points as given in Table 2 were prepared by fractional distillation of the polycarbosilane synthesized in Examples 6–10. Following the procedures of Example 1, experiments were conducted respectively using 200 g of the polycarbosilanes, 100 g of the lubricants indicated in Table 2 and, as silicon carbide powder, 2 kg of "BETA RANDOM ULTRAFINE". The experiments gave silicon carbide plates having substantially the same properties as those prepared in Example 1.

TABLE 2

| Example No. | Organosilicon compound | Lubricant |
|---|---|---|
| 11 | Mark I (m.p. 120–140° C.) | Butyl stearate |
| 12 | Mark I (m.p. 50–70° C.) | Carnauba wax |
| 13 | Mark I (m.p. 60–70° C.) | Oleic amide |
| 14 | " | Stearyl alcohol |

EXAMPLE 15

Silicon carbide plates were prepared by conducting forming and sintering operations in the same manner as in Example 2 except that, out of 20 kg of the same silicon carbide powder ("DENSIC ULTRAFINE β-1") as used in Example 2, 8.0 kg was replaced by silicon carbide whiskers (product of Tateho Chemical Industries, Ltd.; diameter: 0.05–0.2 μm; length: 10–40 μm).

In comparing of the above silicon carbide plates with that obtained in Example 2, the appearances and bending strengths were substantially equal to each other but the former silicon carbide plates were superior in impact resistance to the silicon carbide plate obtained in Example 2. The results of the above comparison are summarized in Table 3.

TABLE 3

| Falling distance of weight (cm) | Silicon carbide plate in Ex. 15 | Silicon carbide plate in Ex. 2 |
|---|---|---|
| 10 | | |
| 15 | | X |
| 20 | | X |
| 25 | Δ | X |
| 30 | X | X |

The impact resistance test was conducted in the following manner. Each sample silicon carbide plate was placed horizontally on an experimental table. A cylindrical weight, which was made of a hard plastic material and contained lead, was dropped onto the sample plate from the prescribed heights to observe the extent of fracture of the sample plates. In Table 3, ⊚ indicates no change, Δ partial fracture and X complete fracture into pieces.

What is claimed is:

1. A process for preparing a molded silicon carbide product, which process comprises molding a mixture of silicon carbide powder, an organosilicon compound and a lubricant selected from the group consisting of higher fatty acids, higher fatty acid esters, higher fatty acid amides, higher alcohols and paraffin wax into a compact and sintering the compact wherein the lubricant has the following properties:
   (a) it does not substantially evaporate during such operations as mixing, drying, molding, etc.;
   (b) it is in liquid or solid form, and when it is a solid, it has a melting point of 40° C. or higher;
   (c) it exhibits low viscosity in a melt of a mixture of the lubricant and organosilicon compound; and,
   (d) it undergoes almost complete evaporation at or below a temperature at which the organosilicon compound is pyrolyzed, i.e., at temperatures up to 500° C.;

wherein the organosilicon compound is one or more compounds selected from those in which
   (1) silicon atoms are bonded only to carbon atoms;
   (2) besides the bonds between silicon atoms and carbon atoms, silicon atoms are bonded to hydrogen atoms;
   (3) besides the bonds between silicon atoms and carbon atoms, there are bonds formed between silicon atoms and halogen atoms;
   (4) in addition to the bonds between silicon atoms and carbon atoms, there are bonds established between silicon atoms per se; and
   (5) there are two or more types of bonds out of the above-mentioned bonds (2) through (4), or a polycondensation product, obtained by polycondensation of these compounds, containing silicon-carbon bonds as its principal backbone structure; and wherein the ratio of lubricant to organosilicon compound is in the range of 0.2 to 1 to 2.0 to 1.

2. A process as claimed in claim 1, wherein said higher fatty acids are used as a lubricant.

3. A process as claimed in claim 1, wherein said higher fatty acid esters are used as a lubricant.

4. A process as claimed in claim 1, wherein said higher fatty acid amides are used as a lubricant.

5. A process as claimed in claim 1, wherein said higher alcohols are used as a lubricant.

6. A process as claimed in claim 1, wherein said paraffin wax is used as a lubricant.

7. A process as claimed in claim 1, wherein two or more materials selected from the group consisting of higher fatty acids, higher fatty acid esters, higher fatty acid amides, higher alcohols and paraffin wax are used in combination as the lubricant.

8. A process as claimed in claim 1, wherein a part of the silicon carbide powder consists of silicon carbide whiskers.

9. A process as claimed in claim 1, wherein said molding is carried out by injection.

10. A process as claimed in claim 2, wherein a part of the silicon carbide powder consists of silicon carbide whiskers.

11. A process as claimed in claim 2, wherein said molding is carried out by injection.

12. A process as claimed in claim 3, wherein a part of the silicon carbide powder consists of silicon carbide whiskers.

13. A process as claimed in claim 3, wherein said molding is carried out by injection.

14. A process as defined in claim 4, wherein a part of the silicon carbide powder consists of silicon carbide whiskers.

15. A process as claimed in claim 4, wherein said molding is carried out by injection.

16. A process as claimed in claim 5, wherein a part of the silicon carbide powder consists of silicon carbide whiskers.

17. A process as claimed in claim 5, wherein said molding is carried out by injection.

18. A process as claimed in claim 6, wherein a part of the silicon carbide powder consists of silicon carbide whiskers.

19. A process as claimed in claim 6, wherein said molding is carried out by injection.

20. A process as claimed in claim 7, wherein a part of the silicon carbide powder consists of silicon carbide whiskers.

21. A process as claimed in claim 7, wherein said molding is carried out by injection.

22. A process as claimed in claim 8, wherein said molding is carried out by injection.

23. A process as claimed in claim 10, wherein said molding is carried out by injection.

24. A process as claimed in claim 12, wherein said molding is carried out by injection.

25. A process as claimed in claim 14, wherein said molding is carried out by injection.

26. A process as claimed in claim 16, wherein said molding is carried out by injection.

27. A process as claimed in claim 18, wherein said molding is carried out by injection.

28. A process as claimed in claim 20, wherein said molding is carried out by injection.

* * * * *